(12) United States Patent
Yoon et al.

(10) Patent No.: US 10,923,778 B2
(45) Date of Patent: Feb. 16, 2021

(54) BATTERY CELL

(71) Applicant: LG CHEM, LTD., Seoul (KR)

(72) Inventors: Ji-Su Yoon, Daejeon (KR); Dal-Mo Kang, Daejeon (KR); Jeong-O Mun, Daejeon (KR); Jae-Uk Ryu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 112 days.

(21) Appl. No.: 16/095,871

(22) PCT Filed: Sep. 22, 2017

(86) PCT No.: PCT/KR2017/010505
§ 371 (c)(1),
(2) Date: Oct. 23, 2018

(87) PCT Pub. No.: WO2018/135720
PCT Pub. Date: Jul. 26, 2018

(65) Prior Publication Data
US 2020/0076015 A1    Mar. 5, 2020

(30) Foreign Application Priority Data

Jan. 17, 2017 (KR) .................. 10-2017-0008280

(51) Int. Cl.
*H01M 2/12* (2006.01)
*H01M 10/48* (2006.01)
(Continued)

(52) U.S. Cl.
CPC ....... *H01M 10/486* (2013.01); *H01M 50/375* (2021.01); *H01M 50/383* (2021.01);
(Continued)

(58) Field of Classification Search
CPC ..................................................... H01M 2/127
See application file for complete search history.

(56) References Cited

U.S. PATENT DOCUMENTS

| 5,494,762 A | 2/1996 | Isoyama et al. |
| 6,187,472 B1 | 2/2001 | Shiota et al. |

(Continued)

FOREIGN PATENT DOCUMENTS

| JP | H06-132040 A | 5/1994 |
| JP | H10-294097 A | 11/1998 |

(Continued)

OTHER PUBLICATIONS

Machine Translation of KR101715694 (published patent corresponding to unexamined publication No. KR 2015-0032027) (Year: 2017).*

(Continued)

*Primary Examiner* — Wyatt P McConnell
(74) *Attorney, Agent, or Firm* — Birch, Stewart, Kolasch & Birch, LLP

(57) ABSTRACT

Disclosed is a battery cell, which includes an electrode assembly, a battery case having a case body for accommodating the electrode assembly and a case terrace extending from the case body, a pair of electrode leads configured to protrude out of the battery case and electrically connected to the electrode assembly, and an overcharge cut-off unit provided in the case terrace to prevent overcharge of the battery cell.

12 Claims, 3 Drawing Sheets

(51) Int. Cl.
   *H01M 50/375* (2021.01)
   *H01M 50/383* (2021.01)
   *H01M 50/30* (2021.01)
   *H01M 50/578* (2021.01)
   *H01M 50/581* (2021.01)

(52) U.S. Cl.
   CPC ....... *H01M 50/394* (2021.01); *H01M 50/578* (2021.01); *H01M 50/581* (2021.01); *H01M 2200/10* (2013.01); *H01M 2200/20* (2013.01)

(56) References Cited

U.S. PATENT DOCUMENTS

| | | |
|---|---|---|
| 2004/0038126 A1 | 2/2004 | Gu |
| 2014/0170447 A1* | 6/2014 | Woehrle ............ H01M 10/4207 429/61 |
| 2015/0056482 A1 | 2/2015 | Kyla-Kaila et al. |
| 2015/0064519 A1* | 3/2015 | Hong .................. H01M 10/637 429/62 |
| 2018/0026256 A1 | 1/2018 | Inoue et al. |
| 2018/0053976 A1 | 2/2018 | Park et al. |

FOREIGN PATENT DOCUMENTS

| | | |
|---|---|---|
| JP | 2001-102098 A | 4/2001 |
| JP | 2003-045492 A | 2/2003 |
| JP | 2008-226807 A | 9/2008 |
| JP | 2010-073647 A | 4/2010 |
| KR | 10-2005-0042620 A | 5/2005 |
| KR | 10-2008-0099715 A | 11/2008 |
| KR | 10-2009-0026648 A | 3/2009 |
| KR | 10-2012-0136830 A | 12/2012 |
| KR | 10-2014-0005323 A | 1/2014 |
| KR | 10-2015-0003779 A | 1/2015 |
| KR | 10-2015-0025974 A | 3/2015 |
| KR | 10-2015-0032027 A | 3/2015 |
| KR | 20150032027 * | 3/2015 |
| KR | 10-2015-0089225 A | 8/2015 |
| KR | 10-2016-0020234 A | 2/2016 |
| KR | 10-2016-0041255 A | 4/2016 |
| WO | WO 2016/132961 A1 | 8/2016 |
| WO | WO 2016/171517 A1 | 10/2016 |

OTHER PUBLICATIONS

International Search Report for PCT/KR2017/010505 dated Jan. 9, 2018.

* cited by examiner

BATTERY CELL

TECHNICAL FIELD

The present disclosure relates to a battery cell.

The present application claims priority to Korean Patent Application No. 10-2017-0008280 filed on Jan. 17, 2017 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing energy efficiency and environment friendliness in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

A conventional battery module or battery pack includes a cut-off circuit for preventing overcharge, but a battery cell does not include a safety device such as a cut-off circuit separately. Accordingly, the battery cell is directly exposed to the danger of explosion or fire, caused by overcharge.

In addition, if the cut-off circuit provided at a battery module or a battery pack does not work due to a malfunction, there is a serious risk since explosion or fire may be caused due to overcharge of the battery cell provided in the battery module or the battery pack.

Thus, it is requested to find a way to prevent explosion or fire caused by overcharge of a battery cell in advance.

DISCLOSURE

Technical Problem

The present disclosure is directed to providing a battery cell, which may prevent explosion or fire caused by overcharge of the battery cell in advance.

Technical Solution

In one aspect of the present disclosure, there is provided a battery cell, comprising: an electrode assembly; a battery case having a case body for accommodating the electrode assembly and a case terrace extending from the case body; a pair of electrode leads configured to protrude out of the battery case and electrically connected to the electrode assembly; and an overcharge cut-off unit provided in the case terrace to prevent overcharge of the battery cell.

The overcharge cut-off unit may include: a cut-off unit body provided between the pair of electrode leads to emit an overcharge cut-off gas out of the battery case when the pair of electrode leads has a temperature over a predetermined temperature or when the battery cell has a voltage over a predetermined voltage; and at least one detection sensor provided to at least one side of the cut-off unit body and disposed close to the pair of electrode leads to detect a temperature of the pair of electrode leads or a voltage of the battery cell.

The overcharge cut-off unit may include: at least one capsule provided in the cut-off unit body and filled with sodium azide; and a burst trigger connected to the at least one detection sensor to break the at least one capsule over the predetermined temperature or over the predetermined voltage.

The overcharge cut-off gas may be a nitrogen gas, and the cut-off unit body may be filled with iron oxide that is capable of reacting with the sodium azide to generate the nitrogen gas.

The cut-off unit body may have at least one gas outlet which protrudes toward the case body and guides the nitrogen gas to be emitted toward the case body.

The overcharge cut-off unit may include at least one cover film provided at the at least one gas outlet to open the at least one gas outlet when the nitrogen gas is emitted.

The detection sensor may be a temperature sensor or a voltage sensor.

The battery cell may be a pouch-type secondary battery.

Advantageous Effects

According to various embodiments as above, it is possible to provide a battery cell, which may prevent explosion or fire caused by overcharge of the battery cell in advance.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
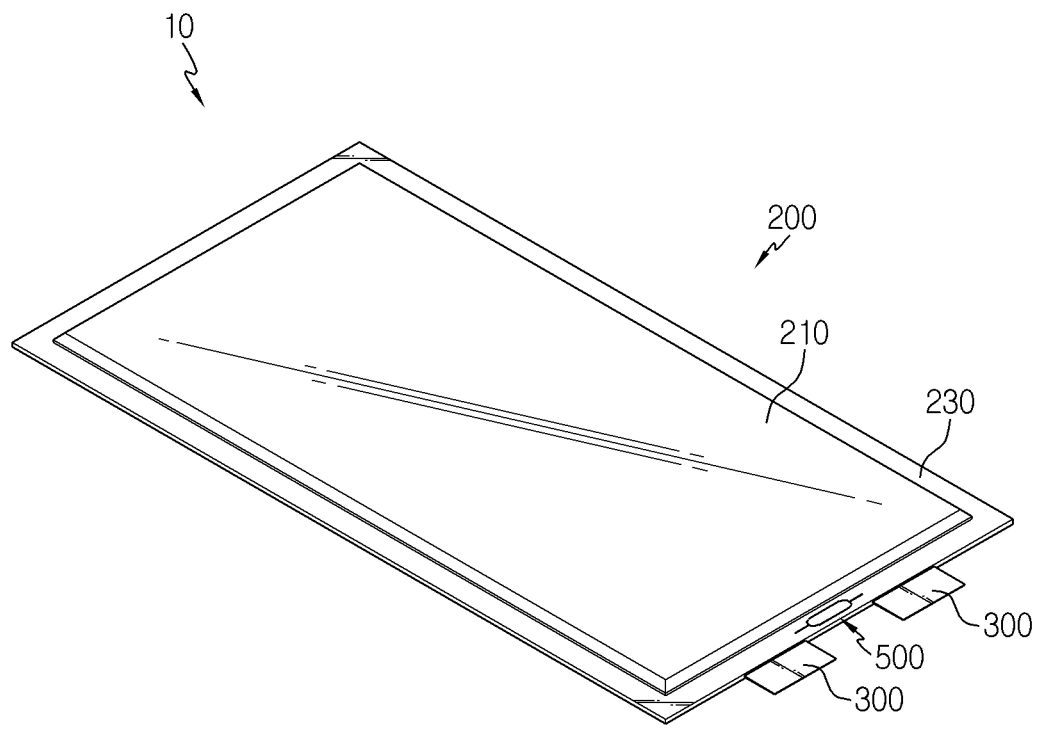
FIG. 1 is a diagram for illustrating a battery cell according to an embodiment of the present disclosure.
Figure 2:
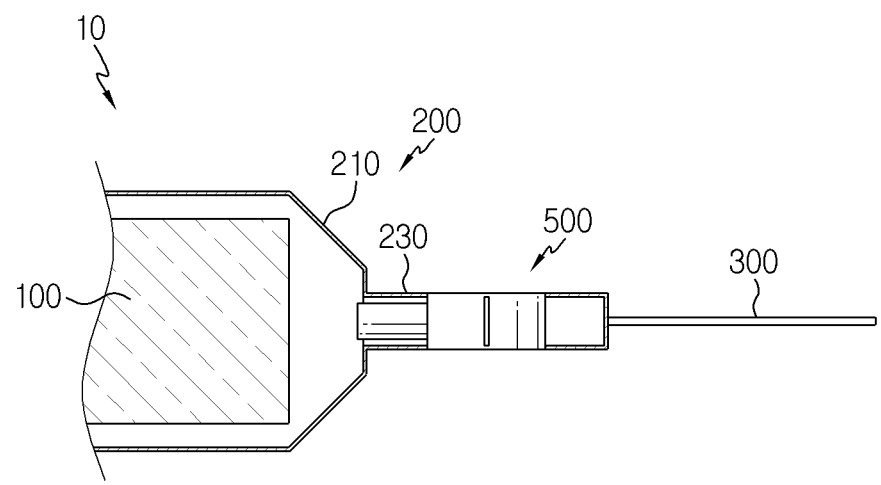
FIG. 2 is a cross-sectioned view showing the battery cell of FIG. 1.
Figure 3:
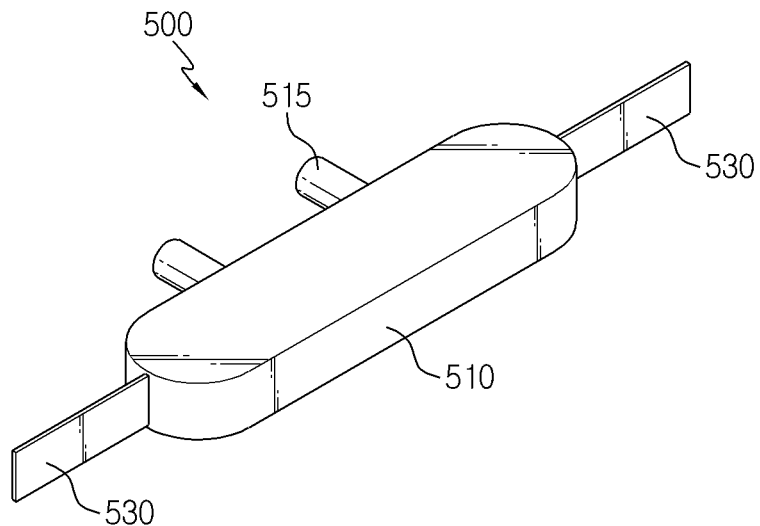
FIG. 3 is a diagram for illustrating an overcharge cut-off unit of the battery cell of FIG. 2.
Figure 4:
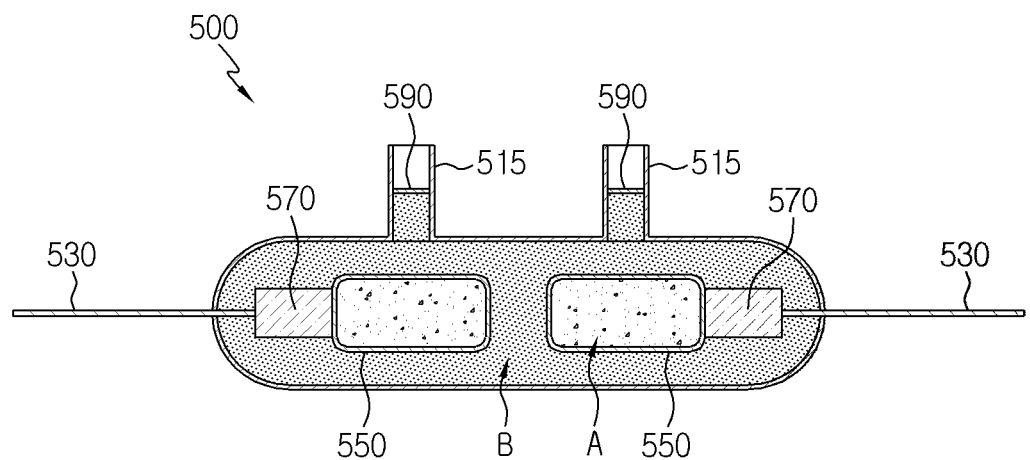
FIGS. 4 and 5 are cross-sectioned views showing the overcharge cut-off unit of FIG. 3.
Figure 5:
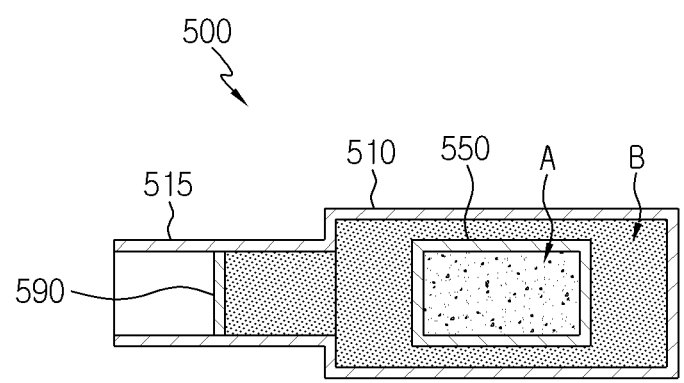

FIG. 1 is a diagram for illustrating a battery cell according to an embodiment of the present disclosure, FIG. 2 is a cross-sectioned view showing the battery cell of FIG. 1, FIG. 3 is a diagram for illustrating an overcharge cut-off unit of the battery cell of FIG. 2, and FIGS. 4 and 5 are cross-sectioned views showing the overcharge cut-off unit of FIG. 3.

Referring to FIGS. 1 to 5, the battery cell 10 is a secondary battery and may be a pouch-type secondary battery. The battery cell 10 may be provided in plural depending on a required output voltage or charge/discharge capacity and configured as a unit such as a battery module or a battery pack.

The battery cell 10 may include an electrode assembly 100, a battery case 200, an electrode lead 300, and an overcharge cut-off unit 500.

The electrode assembly 100 may include a positive electrode plate, a negative electrode plate and a separator. The electrode assembly 100 is well known in the art and thus will not be described in detail here.

The battery case 200 may be made of a laminate sheet including a resin layer and a metal layer and package the electrode assembly 100. The battery case 200 may include case body 210 and a case terrace 230.

The case body 210 may accommodate the electrode assembly 100. For this, the case body 210 may have an accommodation space for accommodating the electrode assembly 100. The case terrace 230 extends from the case body 210 and may be sealed to keep the inside of the case body 210 airtight.

The electrode lead 300 is provided in a pair, and the pair of electrode leads 300 may include a positive electrode lead and a negative electrode lead. The pair of electrode leads 300 is electrically connected to the electrode assembly 100 and may protrude out of the battery case 200, in detail out of the case terrace 230.

The overcharge cut-off unit 500 is provided inside the case terrace 230 and may prevent overcharge of the battery cell 10. The overcharge cut-off unit 500 may be inserted into the case terrace 230 or be mounted inside the case terrace 230 so as to be located inside the case terrace 230.

Hereinafter, the overcharge cut-off unit 500 will be described in more detail.

The overcharge cut-off unit 500 may include a cut-off unit body 510, a detection sensor 530, a capsule 550, a burst trigger 570, and a cover film 590.

The cut-off unit body 510 may be provided between the pair of electrode leads 300 at the inside of the case terrace 230. The cut-off unit body 510 may emit an overcharge cut-off gas N into the battery case 200 when the pair of electrode leads 300 has a temperature over a predetermined temperature or the battery cell 10 has a voltage over a predetermined voltage. Here, the overcharge cut-off gas N may be a nitrogen gas, which will be described in detail later.

The cut-off unit body 510 may be filled with an iron oxide B which reacts with sodium azide of the capsule 550, explained later. Also, the cut-off unit body 510 may be further filled with compounds such as potassium nitrate and silicon dioxide in addition to the iron oxide B. This is to allow the compounds to react with sodium of sodium azide to be synthesized into a safe substance with low reactivity. If sodium meets water at the outside, a large amount of heat may be generated along with a hydrogen gas, which may cause a secondary fire or the like.

The cut-off unit body 510 may include at least one gas outlet 515 that protrudes toward the case body 210 and may guide the nitrogen gas N to be emitted toward the case body 210 when the overcharge cut-off gas N, namely the nitrogen gas N, is emitted.

The gas outlet 515 may be provided in a pair, and the pair of gas outlets 515 may protrude toward the case body 210 so that the nitrogen gas N may be guided more effectively toward the inside of the case body 210 when the nitrogen gas N is emitted.

The detection sensor 530 may be provided in a pair, and the pair of detection sensors 530 may be provided to at least one side of the cut-off unit body 510, or to both sides of the cut-off unit body 510 in this embodiment. Each detection sensor 530 may be disposed near the pair of electrode leads 300 and be electrically connected to the pair of electrode leads 300.

This pair of detection sensors 530 may detect the temperature of the pair of electrode leads 300 or the voltage of the battery cell 10. For this, the pair of detection sensors 530 may be a temperature sensor or a voltage sensor.

The capsule 550 is provided in the cut-off unit body 510, and at least one capsule may be provided. In this embodiment, the capsule 550 is provided in a pair, and the pair of capsules 550 may be filled with sodium azide A that reacts with the iron oxide B. The sodium azide A rapidly reacts when being exposed to the iron oxide B, producing a nitrogen gas N that serves as the overcharge cut-off gas N.

The burst trigger 570 may break the at least one capsule 550, or the pair of capsules 550 in this embodiment, when the temperature or voltage measured by the at least one detection sensor 530 is over the predetermined temperature or the predetermined voltage. For this, the burst trigger 570 may be provided in a pair, which are respectively coupled to the detection sensor 530 and the capsule 550.

The cover film 590 may be provided to the at least one gas outlet 515, or the pair of gas outlets 515 in this embodiment, respectively. The pair of cover films 590 may prevent the iron oxide B inside the cut-off unit body 510 from flowing out of the cut-off unit body 510. In addition, when the nitrogen gas N is generated in the cut-off unit body 510, the pair of cover films 590 may be torn or separated from the gas outlets 515 due to the internal pressure of the cut-off unit body 510 to open the pair of gas outlets 515, so that the nitrogen gas N may be emitted out of the gas outlets 515.

Hereinafter, detailed operations of the overcharge cut-off unit 500 of the battery cell 10 according to this embodiment will be described in more detail.

Figure 6:
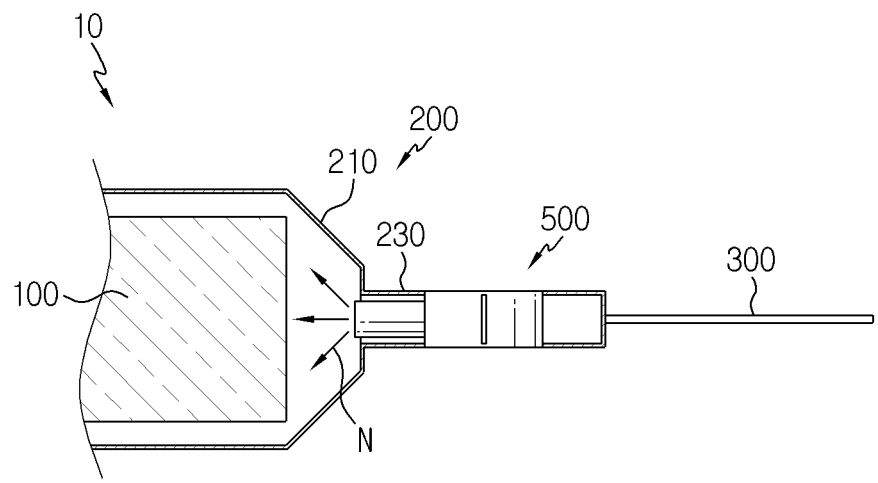
FIGS. 6 and 7 are diagrams for illustrating operations of the overcharge cut-off unit of FIG. 3.
Figure 7:
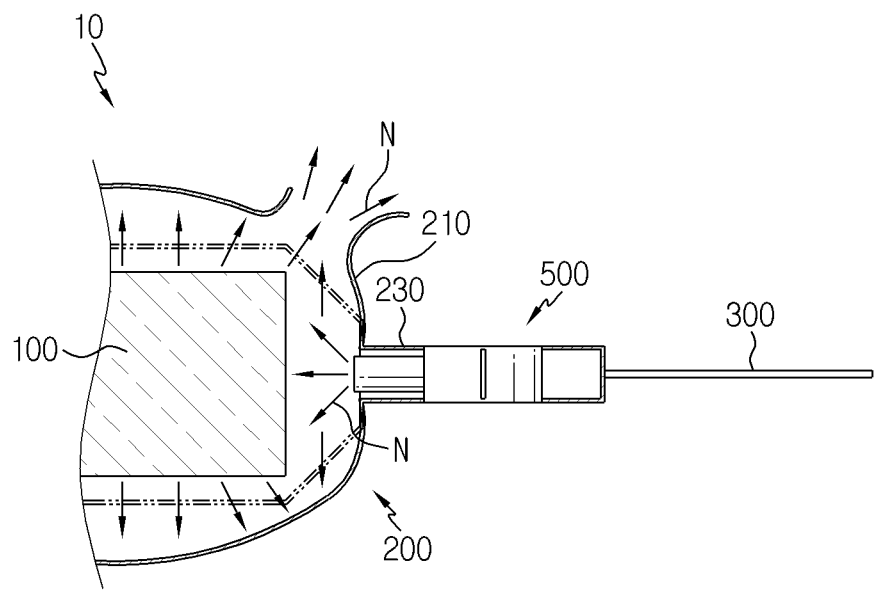

FIGS. 6 and 7 are diagrams for illustrating operations of the overcharge cut-off unit of FIG. 3.

Referring to FIG. 6, if the battery cell 10 is overcharged, the temperature of the electrode lead 300 may rise or the voltage of the battery cell 10 may increase.

In this case, the burst trigger 570 (see FIG. 4) of the overcharge cut-off unit 500 may break the capsule 550 (see FIG. 4) when the detection sensor 530 detects that the temperature of the electrode lead 300 is over the predetermined temperature or the voltage of the battery cell 10 is over the predetermined voltage.

As the capsule 550 bursts, in the cut-off unit body 510, the sodium azide A may react with the iron oxide B to generate the overcharge cut-off gas N, or the nitrogen gas N.

The nitrogen gas N firstly increases the internal pressure of the cut-off unit body 510 to tear off the cover film 590 (see FIG. 4) of the gas outlet 515 or separate the cover film 590 from the gas outlet 515, and then the nitrogen gas N may be emitted into the case body 210 of the battery case 200 through the gas outlet 515.

The nitrogen gas N emitted into the case body 210 may primarily block oxygen to delay a fire of the battery cell 10.

Referring to FIG. 7, after that, the internal pressure of the battery case 200 continuously increases due to the nitrogen gas N which is continuously emitted into the case body 210, so that at least one of the case body 210 and the case terrace 230 may be broken.

Accordingly, the battery cell 10 of this embodiment may prevent thermal explosion of the battery cell 10 since the battery case 200 bursts in advance due to the emission of the nitrogen gas N prior to the thermal explosion caused by overcharge of the battery cell 10.

As described above, in this embodiment, an explosion or fire caused by an overcharge of the battery cell 10 may be prevented in advance, just in the battery cell 10.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery cell, comprising:
   an electrode assembly;
   a battery case having a first sheet and a second sheet forming a case body for accommodating the electrode assembly, the first sheet and second sheet sealed together to form a case terrace extending from the case body;
   a pair of electrode leads configured to protrude out of the battery case and being electrically connected to the electrode assembly; and
   an overcharge cut-off unit provided between the first sheet and second sheet of the case terrace to prevent overcharging of the battery cell, wherein the overcharge cut-off unit includes:
   a cut-off unit body provided between the pair of electrode leads and being configured to emit an overcharge cut-off gas out of the cut-off unit body when the pair of electrode leads has a temperature over a predetermined temperature or when the battery cell has a voltage over a predetermined voltage;
   at least one detection sensor provided to at least one side of the cut-off unit body and configured to detect a temperature of the pair of electrode leads or a voltage of the battery cell; and
   at least one gas outlet protruding toward the case body and configured to guide the overcharge cut-off gas into the case body.

2. The battery cell according to claim 1, wherein the overcharge cut-off unit further includes:
   at least one capsule provided in the cut-off unit body and filled with sodium azide; and
   a burst trigger connected to the at least one detection sensor and being configured to break the at least one capsule when the temperature of the pair of electrode leads is over the predetermined temperature or when the voltage of the battery cell is over the predetermined voltage.

3. The battery cell according to claim 2, wherein the overcharge cut-off gas is a nitrogen gas, and
   wherein the cut-off unit body is filled with iron oxide that is capable of reacting with the sodium azide to generate the nitrogen gas.

4. The battery cell according to claim 1, wherein the overcharge cut-off unit includes at least one cover film provided at the at least one gas outlet, the at least one cover film being configured to open when the overcharge cut-off gas is emitted.

5. The battery cell according to claim 1, wherein the at least one detection sensor is a temperature sensor or a voltage sensor.

6. The battery cell according to claim 1, wherein the battery cell is a pouch-type secondary battery.

7. The battery cell according to claim 1, wherein the at least one detection sensor is electrically connected to the pair of electrode leads.

8. The battery cell according to claim 1, wherein the cut-off body further comprises a first component and a second component, and
   wherein the first component is sodium azide, the second component is iron oxide and the overcharge cut-off gas is nitrogen gas.

9. The battery cell according to claim 1, wherein the at least one detection sensor is a pair of detection sensors, the pair of detection sensors extending from opposite sides of the cut-off body.

10. The battery cell according to claim 9, wherein each of the pair of detection sensors attaches to a respective capsule provided in the cut-off unit body, each capsule filled with a first component, and
    wherein the cut-off unit body is filled with a second component configured to react with the first component to generate the overcharge cut-off gas.

11. The battery cell according to claim 9, wherein the overcharge cut-off unit further includes:
    at least one capsule provided in the cut-off unit body and filled with a first component; and
    a burst trigger connected to the at least one detection sensor and being configured to break the at least one capsule when the temperature of the pair of electrode leads is over the predetermined temperature or when the voltage of the battery cell is over the predetermined voltage.

12. The battery cell according to claim 11, wherein the cut-off unit body is filled with a second component configured to react with the first component to generate the overcharge cut-off gas.

* * * * *